G. W. NICHOLS.
Gang-Saw Mills.

No. 149,600.  Patented April 14, 1874.

Witnesses.       Inventor:
                 George W Nichols
                 By W Burris Atty

UNITED STATES PATENT OFFICE.

GEORGE W. NICHOLS, OF CLINTON CITY, IOWA.

IMPROVEMENT IN GANG-SAW MILLS.

Specification forming part of Letters Patent No. 149,600, dated April 14, 1874; application filed February 19, 1874.

*To all whom it may concern:*

Be it known that I, GEORGE WASHINGTON NICHOLS, of Clinton City, in the county of Clinton and State of Iowa, have invented certain new and useful Improvements in Gang-Saw Mills; and I do hereby declare the following to be a full, clear, and exact description of the invention, such as will enable others skilled in the art to which it pertains to make and use it, reference being had to the accompanying drawings, which form part of this specification.

Figure 1:
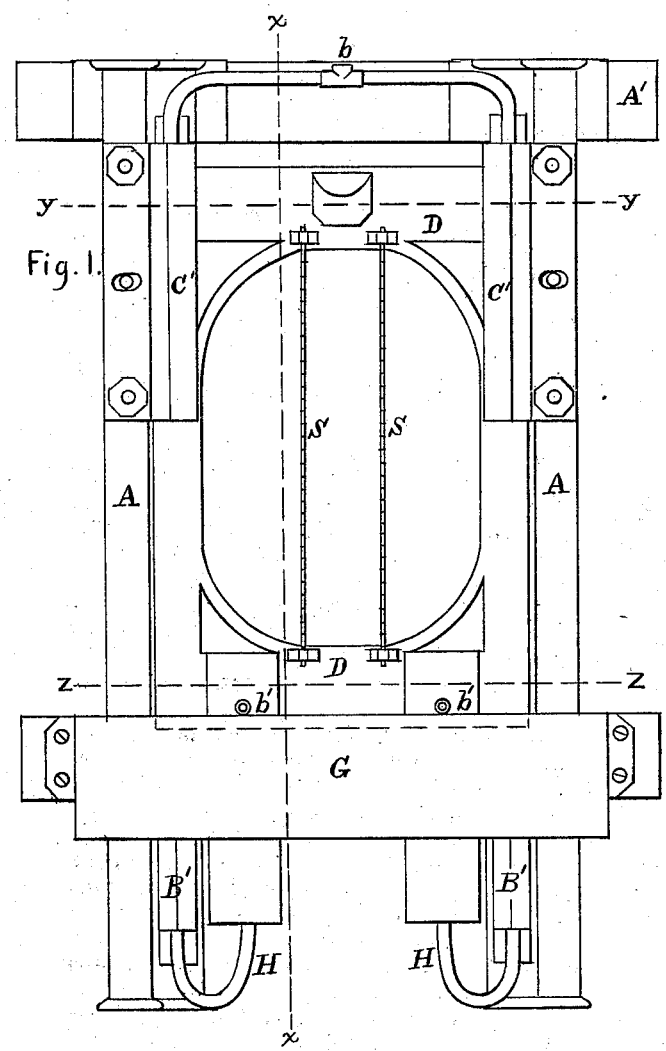
Figure 2:
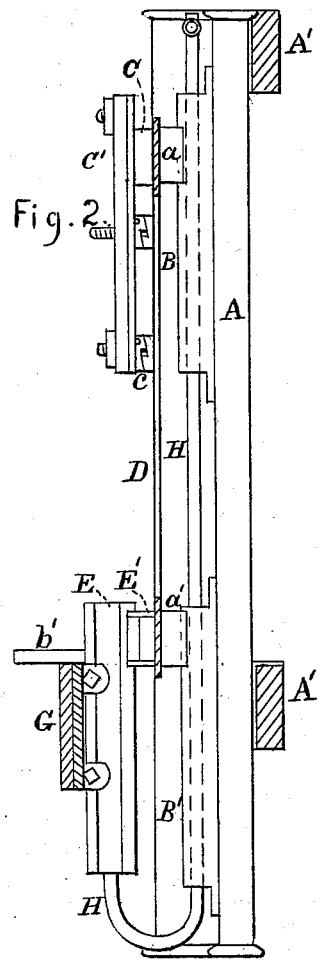
Figures 3, 4:
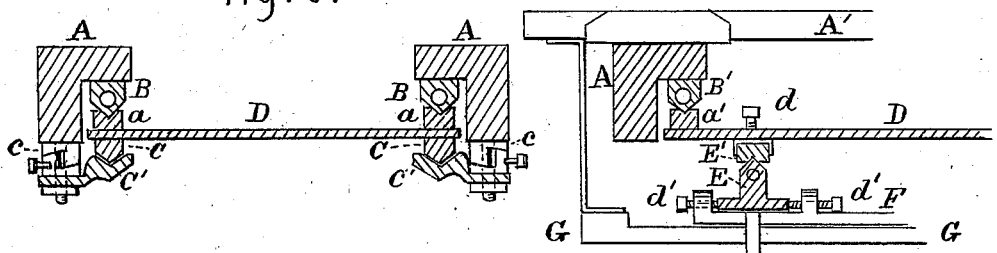

Figure 1 is a front elevation. Fig. 2 is a vertical section on line $x\ x$ of Fig. 1. Fig. 3 is a transverse section taken on line $y\ y$; and Fig. 4 is a section on line $z\ z$ of Fig. 1.

My invention relates to a gang of saws, and consists of L shape fender-posts and hollow angular slides and guides or bearings, provided with cold-water pipes to cool the bearings, as hereinafter described.

A A represent the fender-posts attached to cross-beams A'. The posts are made L shape for their own strength, and to afford secure and firm bearings for the guides and pipes in the inner angles. B B represent hollow angular guides attached in the angles of the upper part of the posts, and B' B' are similar guides on the lower part of the posts. Angular boxes or slides $a\ a'$ are attached to the back of the upper and lower ends of the saw-frame D, and are arranged to slide on the guides B B'. C C represent angular slides attached to the front of the upper part of the saw-frame, and C' C' are adjustable guides, having their bearings on double inclined washers $c$ on the front of the fender-posts. E E represent hollow guides, similar to guides B, on the inside of an adjustable plate, F, attached to a support-bar, G, and E' E' are slides attached to the front of the lower part of the saw-frame, and arranged to slide on the guides E E. H represents water-pipes, extending through guides B B' and E, which pipes are provided with a connecting-joint, $b$, to receive a pipe connecting with a reservoir or force-pump, and $b'\ b'$ represent the ends of the pipes, through which the water escapes. Set-screws $d\ d$ are arranged in the bottom bar of the saw-frame, under slides E' E', to adjust them, and to take up the slack between them, and $d'$ represents set-screws in plate F, for adjusting and holding the guides E E.

The proper space between the upper slides and guides is obtained by the adjustment of the double inclined washers $c$. The continual passage of cold water through the pipes in the hollow guides prevents the heating of the bearings.

S S represent the saws, attached to the frame D.

I am aware of the patent of Richard A. Parsons, July 27, 1869, and I hereby disclaim the same.

What I claim, and desire to secure by Letters Patent, is—

1. The combination of hollow guides or bearings B B' E with water-pipes H, substantially as and for the purpose described.

2. The double inclined washers $c$, in combination with posts A, guides B C', and slides $a$ C, and frame D, substantially as described.

3. The combination of posts A, guides B' E, slides $a'\ e'$, frame D, plate F, and bar G, substantially as described.

4. The combination of posts A, guides B B' E C', slides $a\ a'$ C E', frame D, plate F, and bar G, substantially as and for the purposes described and shown.

5. The water-pipe H, in combination with posts A, guides B B' E, slides $a\ a'$ E', and frame D, substantially as and for the purposes described.

In testimony that I claim the foregoing I have hereunto set my hand.

GEORGE WASHINGTON NICHOLS.

Witnesses:
 WM. W. SANBORN,
 D. TOWNSEND.